(12) United States Patent
Sales Casals et al.

(10) Patent No.: US 10,107,979 B2
(45) Date of Patent: Oct. 23, 2018

(54) OPTICAL CABLE AND MANUFACTURING METHOD

(71) Applicant: PRYSMIAN S.P.A., Milan (IT)

(72) Inventors: Lluis-Ramon Sales Casals, Milan (IT); Jean-Pierre Bonicel, Milan (IT)

(73) Assignee: PRYSMIAN S.P.A, Milan (IT)

( * ) Notice: Subject to any disclaimer, the term of this patent is extended or adjusted under 35 U.S.C. 154(b) by 0 days.

(21) Appl. No.: 15/501,675

(22) PCT Filed: Aug. 12, 2014

(86) PCT No.: PCT/EP2014/067268
§ 371 (c)(1),
(2) Date: Feb. 3, 2017

(87) PCT Pub. No.: WO2016/023580
PCT Pub. Date: Feb. 18, 2016

(65) Prior Publication Data
US 2017/0227726 A1    Aug. 10, 2017

(51) Int. Cl.
*G02B 6/44* (2006.01)

(52) U.S. Cl.
CPC ......... *G02B 6/4402* (2013.01); *G02B 6/443* (2013.01); *G02B 6/4407* (2013.01); *G02B 6/4432* (2013.01); *G02B 6/4458* (2013.01); *G02B 6/4466* (2013.01); *G02B 6/4486* (2013.01); *G02B 6/4494* (2013.01)

(58) Field of Classification Search
CPC ..................... G02B 6/4407; G02B 6/4434
See application file for complete search history.

(56) References Cited

U.S. PATENT DOCUMENTS

| 4,804,245 A | 2/1989 | Katayose et al. |
| 4,859,025 A * | 8/1989 | Houghton ............ G02B 6/4407 385/114 |
| 2003/0206705 A1 | 11/2003 | McAlpine et al. |

FOREIGN PATENT DOCUMENTS

| EP | 0 216 548 | 4/1987 |
| EP | 0 263 363 | 4/1988 |
| FR | 2 534 385 | 10/1982 |
| GB | 2 174 822 | 11/1986 |
| GB | 2 179 072 | 2/1987 |
| JP | 2009-128711 | 6/2009 |
| WO | WO 2009/070200 | 6/2009 |

OTHER PUBLICATIONS

International Search Report from the European Patent Office for International Application No. PCT/EP2014/067268, dated Apr. 17, 2015.

* cited by examiner

*Primary Examiner* — Omar R Rojas
(74) *Attorney, Agent, or Firm* — Finnegan, Henderson, Farabow, Garrett & Dunner, L.L.P.

(57) ABSTRACT

An optical cable including a load bearing core includes a longitudinally and radially extending slot housing at least one optical fiber, wherein the slot has a width providing a low clearance for the optical fiber(s) housed therein and preventing two optical fibers being stuck to one another; and the slot has a depth equal to or lower than a radius of the core.

37 Claims, 5 Drawing Sheets

OPTICAL CABLE AND MANUFACTURING METHOD

CROSS REFERENCE TO RELATED APPLICATION

This application is a national phase application based on PCT/EP2014/067268, filed Aug. 12, 2014, the content of which is incorporated herein by reference.

BACKGROUND

The present invention relates, in general, to optical access networks. More in particular, the present invention relates to an optical cable and a method of manufacturing such a cable.

STATE OF THE ART

As it is known, Fiber-To-The-x (FTTx) is a generic term for any broadband network architecture using optical fibre to provide all or part of the local loop used for last mile telecommunications. The term FTTx is a generalization for several configurations of fiber deployment, ranging from FTTN (fibre to the neighbourhood) to FTTD (fibre to the desktop).

Optical cables are used for access network and FTTx. These cables—also known as "drop optical cables"—should provide good protection to optical fibres while allowing an easy access thereto; they should be suitable for being installed in duct, either by pulling, pushing or blowing, or for aerial installation.

An example of known drop optical cable is disclosed by WO 2009/070200.

FR 2 534 385 discloses an optical cable comprising a cylindrical support which is hollowed out to form a longitudinal cavity in which one or more optical fibres are loosely accommodated. The cable comprises a couple of bearing elements embedded in the cylindrical support, provided longitudinally and symmetrically with respect to the cable axis. The longitudinal cavity is radially extended between the couple of bearing elements and the plane comprising the couple of bearing elements transverses the slot. The support is made of a thermoplastic material, for example polyethylene. The couple of bearing elements are made, for example, of glass fibre, aramid fibre or carbon fibre. The cable is protected by a tape, for example in polyester, and by an outer sheath, for example in an extruded plastic material such as polyethylene, polyurethane, PVC, etc. For example, the optical cable has a cylindrical support with a diameter of 2.8 mm, and a slot 1.7 mm deep and 1.5 mm wide.

EP 0 216 548 relates to an optical fibre cable comprising an elongate core member defining a surficial longitudinally-extending slot, at least one optical fibre located in said slot, and means closing the slot. The core member is made of glass reinforced plastics rod. The core has a modulus of at least 40000 N/mm$^2$, the higher the modulus, the better. The fibres could be an aramid fibre (such as Kevlar-RTN) or carbon fibres. The resin is a polyester-based material. The slot accepts optical fibres housed in a loose tube. This has been found to produce a reliable excess of fibre when installed in the slot in the profile. Around the outside of the core is a composite plastics sheath comprising a longitudinal tape (e.g. polyethylene tape), a woven yarn wrapping or binder (e.g. of polyester material) and an extruded outer sheath (e.g. LDPE). There may be a filler member which closes the slot. According to such document, there are two suitable sizes for the core: 8 mm and 12 mm. For the 8 mm size the slot will be 4 mm deep and 3 mm wide, but would optimally be 2.5 mm wide. For the 12 mm profile, the slot depth will be between 4 and 6 mm and the width between 2.5 mm and 3.2 mm.

SUMMARY OF THE INVENTION

The Applicant has noticed that the optical cable disclosed by FR 2 534 385 has a cylindrical support made of thermoplastic material and a longitudinal cavity extending deeply beyond the cable axis, involving a significant portion of the cylindrical support cross sectional area, correspondingly reducing the solid area. The use of a couple of bearing elements is necessary for providing the thermoplastic core with sufficient mechanical features as required for the deployment of such a cable.

The presence of a tape wound between the cylindrical support and extruded outer sheath is disadvantageous in that the manufacturing process becomes slow and cannot be carried out in a single shot.

EP 0 216 548 discloses to house the optical fibres in a tube, and to insert the tube in a slot made in a core which has a diameter sized accordingly. Therefore, access to the fibres is rather inconvenient, requiring first access and extraction of the tube from the slot of the core and then tube cut or opening. In addition, due to its significantly large size, the cable is more difficult to be installed in duct, either by pulling, pushing or blowing.

The Applicant has also noticed that the optical cable disclosed by EP 0 216 548 comprises two non-extruded layers between the cylindrical support and the extruded outer sheath. This is disadvantageous in that the manufacturing process becomes slow and difficult to be carried out in a single shot.

The Applicant has faced the problem to provide an optical cable with a small diameter, suitable to be installed in small or already hindered ducts, ensuring a good protection to optical fibres against microbending while making them easy to be accessed.

According to the present invention, an optical cable is provided with a load bearing core, acting as a strength member, having a slot with a width such as to provide a low clearance fit for the optical fibre(s) to be housed therein; and having a depth equal to or lower than the core radius. The limited dimensions of the slot allow the manufacture of a small diameter optical cable. The depth of the slot according to the present invention allows the optical fibre(s) to move in the radial direction by a certain amount, so that excess fibre length (EFL) is properly set. Excessive bending and/or stretching of the optical fibre(s) is/are avoided so that the optical fibres maintain optimum transmission properties.

Preferably, the optical cable of the present invention comprises elements that can be made and assembled by continuous process, like extrusion or pultrusion. This allows the cable to be manufactured by a process which is simpler and easier than known manufacturing methods.

According to a first aspect, the present invention provides an optical cable comprising a load bearing core comprising a longitudinally and radially extending slot housing at least one optical fibre, wherein the slot has a width providing a low clearance for the optical fibre(s) housed therein and preventing two optical fibres being stuck one another; and the slot has a depth equal to or lower than a radius of the core.

Advantageously, a sheath is arranged in radial external position with respect to the core, such sheath preferably being an extruded sheath.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Preferably, the core has a substantially circular cross-section.

Preferably, the diameter of the core is at least four (4) times the slot width.

The core is preferably made of fibre reinforced plastic (FRP).

An optical fibre according to the present description and claims generally comprises a core surrounded by a cladding, said core and cladding being preferably made of glass, and one or two coatings. The coating directly contacting the optical waveguide is called "first coating" or "primary coating", and the coating overlying the first one is called "second coating" or "secondary coating". Typically, said first and second coatings are made of a polymeric material, such as a UV-curable acrylate polymer.

As "load bearing core" it is meant a cable core suitable to bear a significant portion of the compression and tensile load applied to the cable.

Preferably, the load bearing core bears the majority of the compression and tensile load applied to the cable.

Advantageously, the core is made of a material having an elastic modulus of at least 40 GPa. Such a feature allows the core to provide the cable with suitable strength to be installed into a duct without additional support and to be used in aerial application as a self-standing cable.

Advantageously, the core has a diameter of 3 mm at most, preferably a diameter greater than 1.9 mm. The resulting cable can have a diameter of from 2.5 mm to 5 mm. The reduced size allows an easy installation in small or hindered ducts and reduced loads due to wind and ice in case of aerial installation.

The optical fibres can be 190/200 or 250 micrometer nominal diameter optical fibers, or up to 900 micrometer nominal diameter tight-buffered optical fibers, with core diameter selected accordingly.

The optical fibre(s) in the slot of the cable of the invention can be single mode or multimode optical fibres.

Preferably, one or two optical fibre(s) are housed in the slot of the cable of the invention.

The slot of the cable of the invention has a width providing a low clearance housing for the optical fibre(s), without causing interference when the fibre(s) are inserted in the slot. Preferably, the slot width is 1.1 times the optical fibre diameter, at least.

Advantageously, the width of the slot of the invention is selected so that the solid cross-section of load bearing core is as large as possible. Also, the width of the slot of the invention is selected for preventing two optical fibres being stuck one another in the slot; preferably, the slot width is smaller than 2 times the optical fibre diameter, more preferably 1.5 times the optical fibre diameter, even more preferably 1.3 times the optical fibre diameter.

Preferably, for optical fibres having a nominal diameter of 250 μm the slot width is not greater than 375 μm, more preferably not greater than 325 μm and even more preferably not greater than 280 μm.

As the slot of the cable of the invention has a depth equal to or lower than the radius of the core, the optical fibre(s) housed therein are offset with respect to the core central axis, thus providing an excess fibre length (EFL).

Preferably, the bottom of the slot is shaped in a substantially semi-circular contour, so that an optical fibre can lay in a stable and comfortable configuration.

The slot can advantageously contain water swellable material.

Preferably, an adhesive layer is interposed between the core and the sheath, so as to assure better adhesion between core and sheath. The adhesive layer can be a hot melt adhesive, based on a thermoplastic adhesive, preferably an acrylate resin or ethylene vinyl acetate polymer.

Advantageously, the sheath is configured so that an indicium of the position of the slot in the core is present.

In an embodiment, the indicium is a flattened longitudinally extended area in the outer surface of the sheath in correspondence to the slot longitudinal extension.

In an alternative embodiment, the indicium of the position of the slot can be a colored line, such as an ink line.

The optical cable of the invention can further comprise an additional longitudinally extended reinforcing structure.

The additional reinforcing structure can include two rods or yarns embedded into the core or into the sheath, preferably laying in a plane perpendicular to the slot depth.

The additional reinforcing structure can include a reinforcing layer interposed between the core and the sheath. In case an adhesive layer is present between core and sheath the additional reinforcing layer is provided in a radially external position with respect to the adhesive layer.

According to a second aspect, the present invention provides a method of manufacturing an optical cable, comprising:

providing a load bearing core comprising a longitudinally and radially extending slot configured for housing at least one optical fibre, wherein the slot has a width providing a low clearance for the optical fibre(s) housed therein and preventing two optical fibres being stuck one another; and the slot has a depth equal to or lower than a radius of the core;

housing at least one optical fibre in the slot, winding the cable in a coil while orienting the opening of the longitudinal slot radially outwardly with respect to the coil.

Preferably, a sheath is applied over the core before winding the cable in a coil. More preferably, the sheath is applied by extrusion, preferably by tube-extrusion.

Preferably, an indicium of the position of the slot is made on the sheath.

Winding the cable with outwardly oriented slot, in a coil of selected diameter, provides a cable with a controlled excess fibre length, suitable for protecting the fiber or fibers from stress during deployment and operation, which is particularly advantageous when significant cable strain is expected either during cable laying or during operation, for example in case of aerial applications.

BRIEF DESCRIPTION OF DRAWINGS

The present invention will become more clear from the following detailed description, given by way of example and not of limitation, with reference to the accompanying figures, wherein.

DESCRIPTION OF EXAMPLES

Figure 1A:
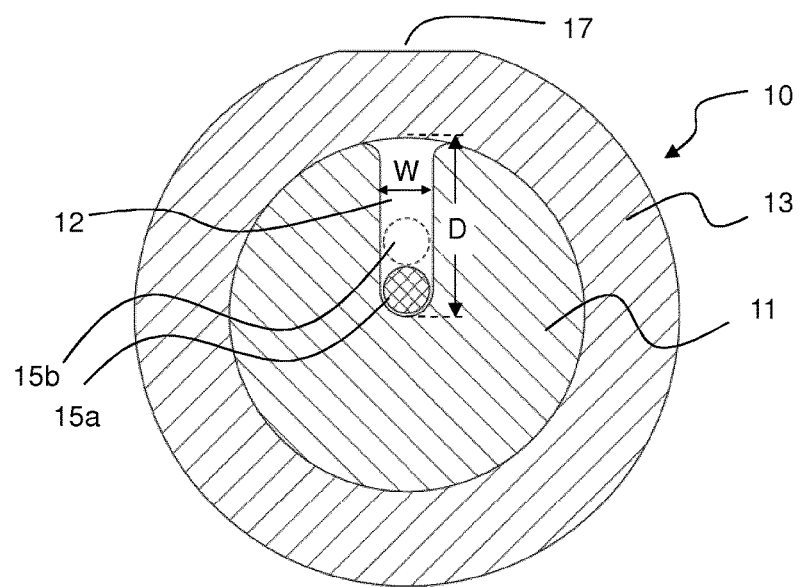
FIGS. 1a and 1b are a cross-section and an axonometric view, respectively, of an optical cable according to a first embodiment of the present invention.
Figure 1B:
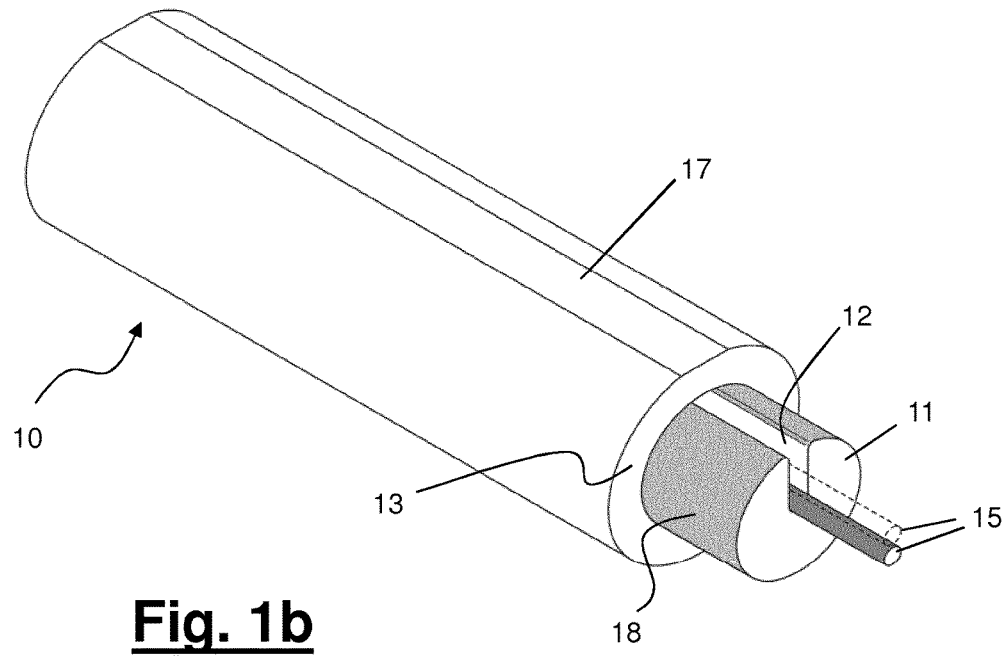

FIGS. 1a and 1b schematically show an optical cable according to a first embodiment of the present invention.

Cable 10 comprises a load bearing core 11 with a slot 12 where one or more optical fibres 15a, 15b are housed. Cable 10 also preferably comprises a sheath or jacket 13 arranged in an outer position with respect to core 11.

Load bearing core 11 has preferably a substantially curved-bottom cross-section. Core 11 is preferably made of a fibre reinforced composite material or FRP based, for example, on any of glass fibres, carbon fibres, aramid fibres, poly (p-phenylene-2,6-benzobisoxazole) (PBO) fibres or the like embedded in a polymeric resin. In examples, core 11 is essentially made of glass-reinforced plastic, GRP, with modulus of elasticity of 50 GPa.

The core 11 can be produced by pultrusion, by UV curing or any other known technique. Pultrusion results in a more regular product.

Core 11 has preferably a circular cross-section. However, it can have a cross-section different from circular, for instance it can be oval.

In the embodiment of FIGS. 1a, 1b, one single optical fibre 15a is housed in the slot 12. Another optical fibre 15b can be housed in the slot 12 in stacked configuration with respect to the optical fibre 15a. Optical fibre(s) 15 can be independent fibres, fibres in ribbon or bundled fibres.

In the embodiment of FIGS. 1a, 1b the core 11 has a diameter of 1.95 mm.

In the embodiment of FIGS. 1a, 1b the slot 12 has a depth D of 0.975 mm.

Preferably, the slot 12 is open at the outer surface of the core 11 and the opening is bevelled for a more comfortable introduction of the optical fibre(s) 15a, 15b. Preferably, the opening is rounded with a radius of between 0.08 mm and 0.15 mm. In one example, the radius of rounded opening sides is 0.01 mm.

In order to avoid longitudinal water propagation, the slot 12 can contain water swellable material (not shown). A layer of water swellable material can be provided to cover, at least partially, the slot 12 surface. In addition or as an alternative, one or more water swellable yarns can be housed into the slot 12 together with the optical fibre(s) 15a, 15b, preferably in radial external position with respect to the fibre(s).

Preferably, a ratio between the diameter of the core and the slot width W is higher than 4. This is of particular advantage for aerial installation where a significant cross section of the core can limit the cable elongation when installed at a determinate span under wind and ice loads.

A polymeric sheath 13 can be arranged radially outer of the core 11. The sheath 13 can be extruded directly on the load bearing core 11. The sheath 13 may comprise polyethylene (PE), crosslinked PE, poly(vinyl chloride) (PVC), thermoplastic or thermoset compounds, preferably emitting limited smoke and not containing halogen, aliphatic polyamides, Nylon, Silicone, Rubber, or the like.

Preferred thickness of the sheath 13 can be of from 0.45 to 0.50 mm. However, thickness of the jacket 13 can be higher or lower than the above range.

Preferably, the outer surface of the core 11 is coated, at least partially, with a hot melt adhesive layer 18. Hot melt can be based, for example, on ethylene ethyl acrylate (EEA) or ethylene vinyl acetate (EVA).

In the present embodiment, the sheath 13 comprises a flat portion (or flattened longitudinally extended area) 17 which extends in a longitudinal direction. Flat portion 17 is extended radially external with respect to a plane passing through the middle plane of the slot 12. Therefore, the slot aperture results arranged substantially below the flat portion and can be easily identified. Therefore, it becomes easy to locate the slot position. This has a number of advantages, including an easy management (for instance easy coiling) of the cable during manufacturing thereof or an easy positioning of dead-end clamps. Further or different indicia could be provided for locating the opening of the slot from the outer surface of the sheath, such as an indentation or an ink line.

The flat portion 17 can have a width between 0.5 mm and 0.9 mm. In one example, flat portion 17 is about 0.77 mm width thus providing a reduction of the cable diameter of 0.05 mm in the flat area.

A thin polymeric layer (based on, for instance, EEA or EVA) can be provided over the outer surface of the load bearing core 11 to improve adhesion of the sheath 13.

As said above, outer sheath 13 can be made of thermoplastic or thermoset compounds that emit limited smoke and substantially no halogen when exposed to high temperature sources. Preferably, the sheath outer surface has a limited coefficient of friction (0.08-0.15) due to the material which is made of or because of the addition, for example by spraying, of a suitable anti-friction agent.

The cable 10 according to the invention can be manufactured, preferably in a continuous process, starting from the load bearing core 11 which is obtained by extrusion or pultrusion. During the manufacturing process optical fibre(s) 15a (15b) are inserted into the slot 12 and the sheath 13 is applied by extrusion. In the case the position of the slot is marked by a flat portion (17), the sheath is preferably manufactured by tube extrusion.

Preferably, the cable manufacturing process includes a step of winding the cable in a coil while orienting the opening of the longitudinal slot radially outwardly with respect to the coil wherein a pulley of controlled diameter is use for coiling the cable. This results in a cable with a suitable excess fibre length (EFL).

As "excess fibre length" is meant the value given by the following formula $$EFL(\%) = \frac{L_f - L_t}{L_t} \cdot 100$$

wherein $L_f$ is the length of an optical fibre and
$L_t$ is the length of the cable housing the fibre(s).

In particular, the amount of EFL can depend on the diameter of the pulley where the cable is passing through. For example, a pulley having a diameter of 200 mm can provide the optical cable with an EFL of 1.2%; a pulley having a diameter of 100 mm can provide the optical cable with an EFL of 2.4%; a pulley having a diameter of 50 mm can provide the optical cable with an EFL of 4.7%; a pulley having a diameter of 40 mm can provide the optical cable with an EFL of 5.8%.

The optical cable according to the invention is self-supporting and it can be profitably used as drop cable for span of at least 10 m, advantageously of 50-150 m. While providing a good protection of optical fibres the small diameter of the cable of the invention allows a better aerial mechanical performance because it offers a reduced resistance to wind compared with other drop cables existing on the market.

The cable can be installed either by pulling or by pushing into a conduit also without a probe guide.

A further advantage is that it can be easily mounted with connectors. This is because the load bearing core performs as bend stiffener protecting the fibre from much reduced diameter bends.

Figure 2A:
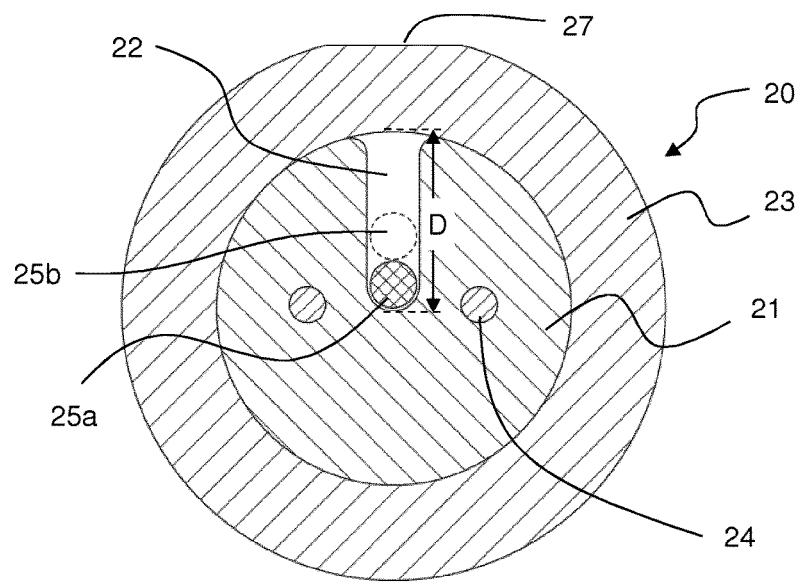
FIGS. 2a and 2b are a cross-section and an axonometric view, respectively, of an optical cable according to a second embodiment of the present invention.
Figure 2B:
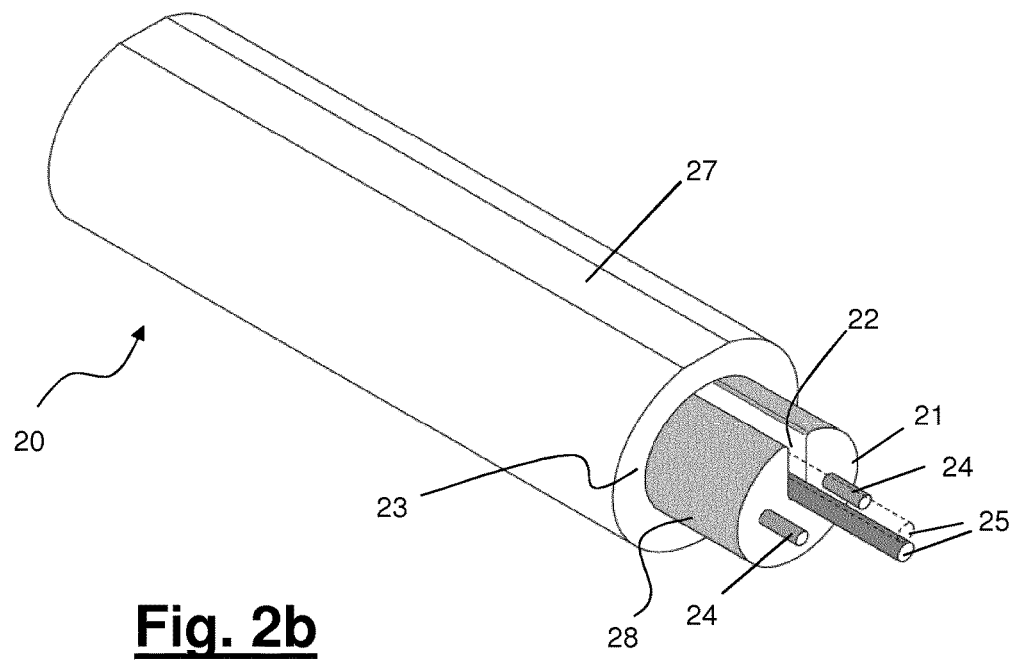

FIGS. 2a and 2b show a second embodiment of the cable according to the present invention. The cable has been designated by reference number 20. The same or similar parts of the cable of the second example have been designated by reference numbers similar to the reference numbers of the first example wherein the first digit is "2" and not "1".

The cable 20 of FIGS. 2a, 2b is generally similar to the cable of FIG. 1 and the detailed description will not be repeated. The difference is that the cable 20 further comprises two reinforcing elements 24. Preferably, the centre of each reinforcing element lies in a plane perpendicular to the depth D of the slot 22. Preferably, each of the reinforcing elements 24 is at the same distance from the centre of the load bearing core 21.

Reinforcing elements 24 can be in the form of a couple of rods or yarns. They can comprise aramid yarns or glass fibres.

Reinforcing elements 24 can have a diameter of from 0.3 to 1 mm.

Profitably, a thin polymeric layer (for instance including EEA or EVA) can be provided over the reinforcing elements 24 to improve adhesion with core material.

Figure 3A:
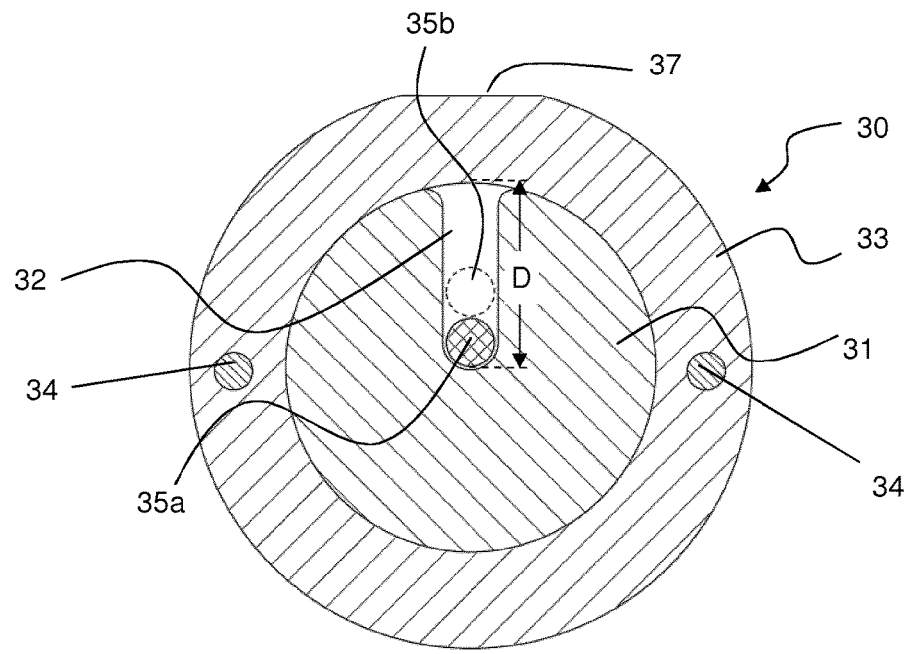
FIGS. 3a and 3b are a cross-section and an axonometric view, respectively, of an optical cable according to a third embodiment of the present invention.
Figure 3B:
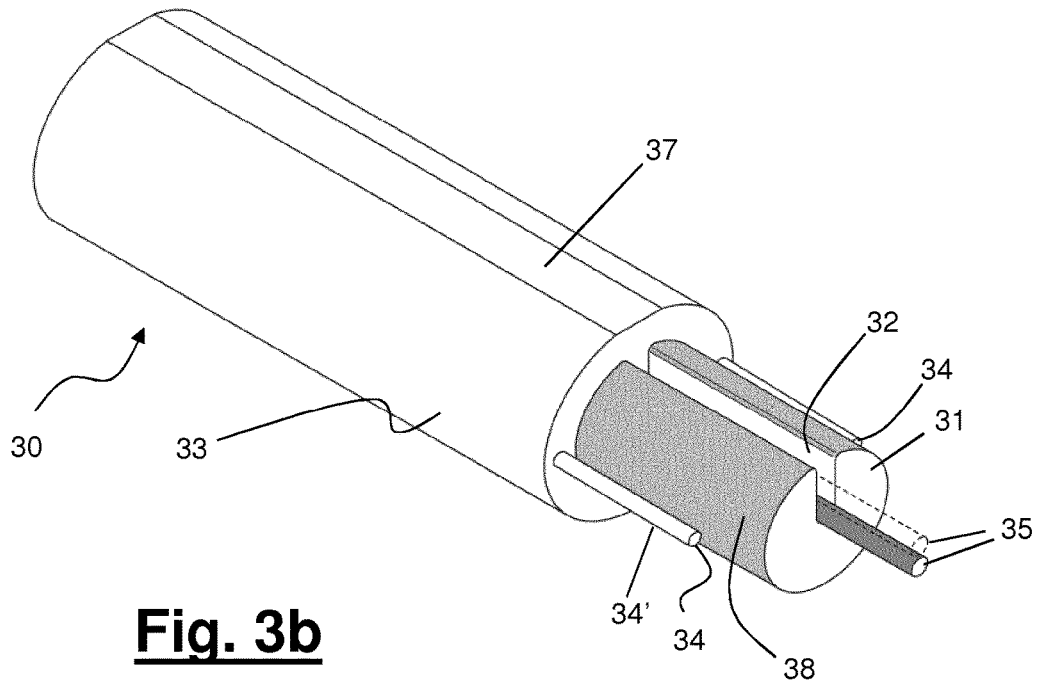

FIGS. 3a and 3b show a third embodiment of the cable according to the present invention. The cable has been designated by reference number 30. The same or similar parts of the cable of the third example have been designated by reference numbers similar to the reference numbers of the first example wherein the first digit is "3" and not "1".

The cable 30 of FIGS. 3a, 3b is generally similar to the cable of FIG. 1 and the detailed description will not be repeated. The difference is that the cable 30 further two reinforcing elements 34. Preferably, the centre of each reinforcing element 34 lies in a plane perpendicular to the depth D of the slot 32. Preferably, each of the reinforcing elements 34 is at the same distance from the centre of the load bearing core 31.

Reinforcing elements 34 can be in the form of a couple of rods or yarns. They can comprise aramid yarns or glass fibres.

Reinforcing elements 34 can have a diameter of from 0.3 to 1 mm.

Profitably, a thin polymeric layer 34' (for instance including EEA or EVA) can be provided over the reinforcing elements 34 to improve adhesion with sheath material.

Figure 4A:
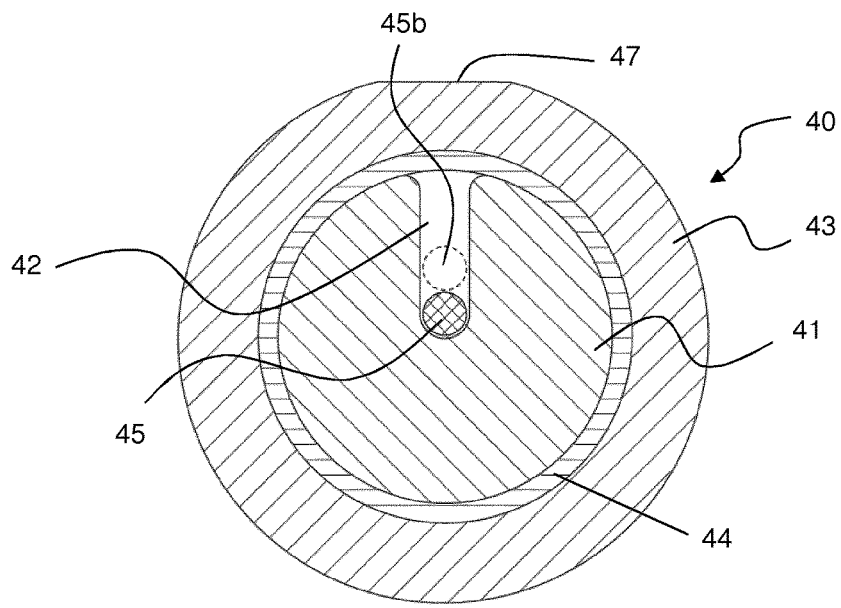
FIGS. 4a and 4b are a cross-section and an axonometric view, respectively, of an optical cable according to a fourth embodiment of the present invention.
Figure 4B:
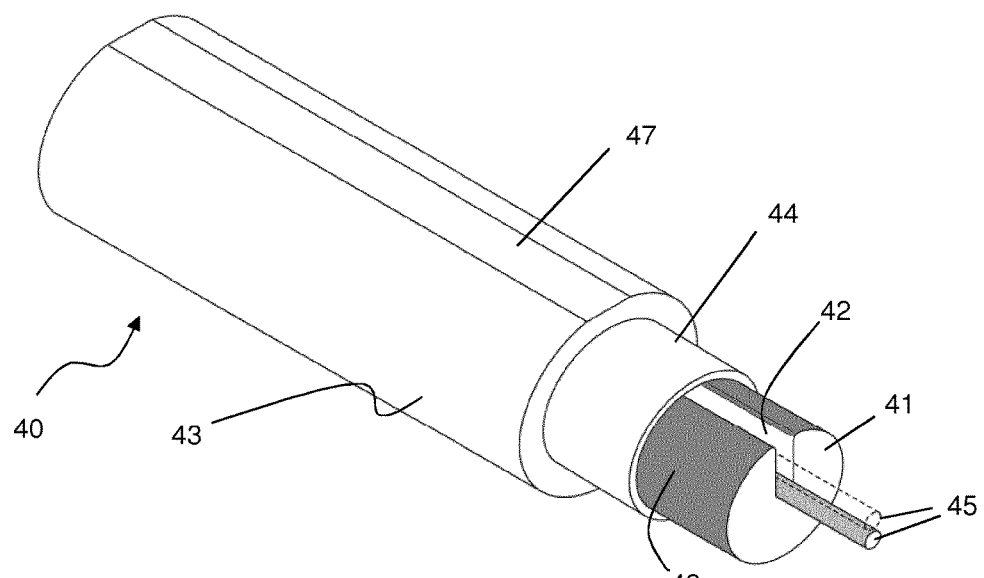

FIGS. 4a and 4b show a fourth embodiment of a cable according to the present invention. The cable has been designated by reference number 40. The same or similar parts of the cable of the third example have been designated by reference numbers similar to the reference numbers of the first example wherein the first digit is "4" and not "1".

The cable 40 of FIGS. 4a and 4b is generally similar to the cable of FIG. 1 and the detailed description will not be repeated. The difference is that the cable 40 according to the fourth example further comprises a longitudinally extended reinforcing layer 44 between the load bearing core 41 and the sheath 43. Alternatively, layer 44 can be helically wound. Preferably, the cylinder element 44 has a thickness of 0.3 to 1 mm.

Profitably, a thin polymeric layer (for instance including EEA or EVA) can be provided over the inner and/or outer surface of the reinforcing element 44 to improve adhesion with core material and/or sheath material.

Figure 5A:
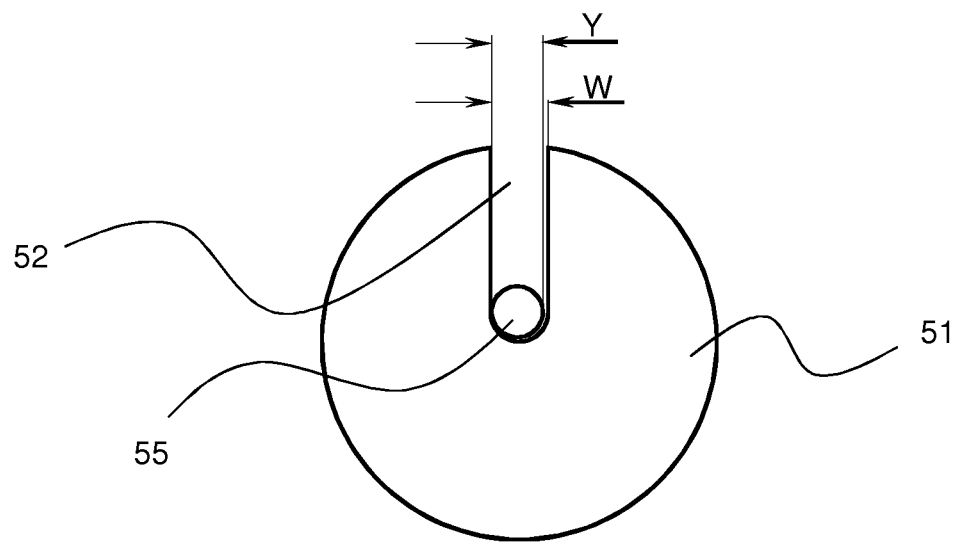
FIGS. 5a and 5b show two cable cores according to embodiments of the invention with slots of different width.

FIG. 5a shows a core 51 with a slot 52 having a width W, housing an optical fibre 55 having a diameter Y. W is 1.1 times Y so as to provide a low clearance housing of the fiber in the slot without causing interference when the optical fibre 55 is inserted in the slot 52.

Figure 5B:
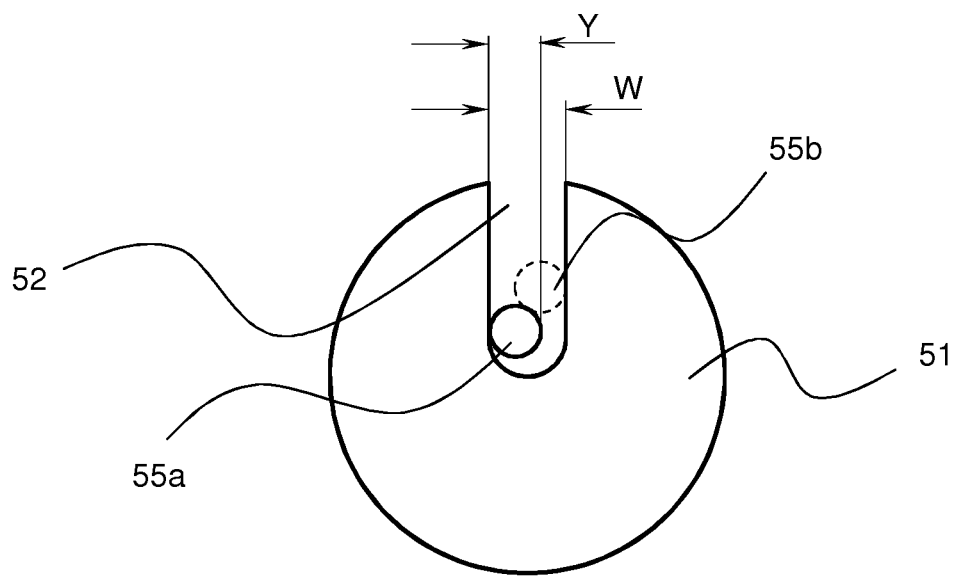

In FIG. 5b W is 1.5 times Y, so as to prevent two optical fibres 55a and 55b from being stuck one another. The possibility of sticking two optical fibres co-housed in the core slot can also depend on the friction coefficient of the optical fibre coating, of the core material and, if any, of the water swellable material covering, at least partially, the slot surface, and the suitable width W should be selected accordingly.

The invention claimed is:

1. An optical cable comprising a load bearing core comprising a longitudinally and radially extending slot housing an optical fibre,
   wherein the slot has an opening and a width ranging from about 1.1 to 1.5 times a diameter of the optical fibre thereby providing a low clearance for the optical fibre housed therein and preventing the optical fibre being stuck to a second optical fibre when present; and
   the slot has a depth equal to or less than a radius of the core;
   and the core has a diameter of 3 mm at most; and
   wherein a sheath is arranged in radial external position with respect to the core, an adhesive layer is interposed between the core and the sheath, and the adhesive layer does not comprise a tape.

2. The optical according to claim 1, wherein the sheath is an extruded sheath.

3. The optical cable according to claim 1, wherein the core has a substantially circular cross-section.

4. The optical cable according to claim 1, wherein the core has a diameter at least four times the slot width.

5. The optical cable according to claim 1, wherein the core is made of fibre reinforced plastic.

6. The optical cable according to claim 1, wherein the core is made of a material having an elastic modulus of at least 40 GPa.

7. The optical cable according to claim 1, wherein the core has a diameter greater than 1.9 mm.

8. The optical cable according to claim 1, wherein the cable has a diameter ranging from 2.5 mm to 5 mm.

9. The optical cable according to claim 1, wherein two optical fibres are housed in the slot.

10. The optical cable according to claim 1, wherein the slot width is less than 1.3 times the optical fibre diameter.

11. The optical cable according to claim 1, wherein the slot contains water swellable material.

12. The optical cable according to claim 1, wherein the sheath is configured so that an indicium of the position of the slot in the core is present.

13. The optical cable according to claim 1, comprising an additional longitudinally extended reinforcing structure.

14. A method of manufacturing an optical cable, comprising:
   providing a load bearing core comprising a longitudinally and radially extending slot configured for housing an optical fibre, wherein the slot has an opening and a width ranging from about 1.1 to 1.5 times a diameter of the at least one optical fibre thereby providing a low clearance for the optical fibre housed therein and preventing the optical fibre being stuck to a second optical fibre when present, and wherein the slot has a depth equal to or less than a radius of the core, and wherein the core has a diameter of 3 mm at most;
   housing the optical fibre in the slot;
   winding the cable onto a coil while orienting the opening of the slot radially outwardly with respect to the coil;
   applying a sheath over the core before winding the cable onto the coil; and
   providing an adhesive layer interposed between the core and the sheath, wherein said adhesive layer does not comprise a tape.

15. The method according to claim 14, wherein the sheath is applied by extrusion.

16. The optical cable according to claim 12, wherein the indicium is a flattened longitudinally extended area of an outer surface of the sheath in correspondence with the slot longitudinal extension.

17. The optical cable according to claim 12, wherein the indicium is a colored line.

18. The method according to claim 14, further comprising the step of providing a water swellable material in the slot.

19. The method according to claim 14, further comprising the step of providing an indicium of the position of the slot in the core, wherein the indicium is a flattened longitudinally extended area of an outer surface of the sheath in correspondence with the slot longitudinal extension or a colored line.

20. An optical cable comprising a load bearing core comprising a longitudinally and radially extending slot housing an optical fibre,
   wherein the slot has an opening and a width ranging from about 1.1 to 1.5 times a diameter of the optical fibre thereby providing a low clearance for the optical fibre housed therein and preventing the optical fibre being stuck to a second optical fibre when present; and
   the slot has a depth equal to or less than a radius of the core;
   and the core has a diameter of 3 mm at most; and
   wherein a sheath is arranged in radial external position with respect to the core, the sheath is configured so that an indicium of the position of the slot in the core is present, and the indicium is a flattened longitudinally extended area of an outer surface of the sheath in correspondence with the slot longitudinal extension.

21. The optical according to claim 20, wherein the sheath is an extruded sheath.

22. The optical cable according to claim 20, wherein the core has a substantially circular cross-section.

23. The optical cable according to claim 20, wherein the core has a diameter at least four times the slot width.

24. The optical cable according to claim 20, wherein the core is made of fibre reinforced plastic.

25. The optical cable according to claim 20, wherein the core is made of a material having an elastic modulus of at least 40 GPa.

26. The optical cable according to claim 20, wherein the core has a diameter greater than 1.9 mm.

27. The optical cable according to claim 20, wherein the cable has a diameter ranging from 2.5 mm to 5 mm.

28. The optical cable according to claim 20, wherein two optical fibres are housed in the slot.

29. The optical cable according to claim 20, wherein the slot width is less than 1.3 times the optical fibre diameter.

30. The optical cable according to claim 20, wherein the slot contains water swellable material.

31. The optical cable according to claim 20, wherein an adhesive layer is interposed between the core and the sheath and wherein the adhesive layer does not comprise a tape.

32. The optical cable according to claim 20, comprising an additional longitudinally extended reinforcing structure.

33. The optical cable according to claim 20, wherein the indicium is a colored line.

34. A method of manufacturing an optical cable, comprising:
   providing a load bearing core comprising a longitudinally and radially extending slot configured for housing an optical fibre, wherein the slot has an opening and a width ranging from about 1.1 to 1.5 times a diameter of the at least one optical fibre thereby providing a low clearance for the optical fibre housed therein and preventing the optical fibre being stuck to a second optical fibre when present, and wherein the slot has a depth equal to or less than a radius of the core, and wherein the core has a diameter of 3 mm at most;
   housing the optical fibre in the slot;
   winding the cable onto a coil while orienting the opening of the slot radially outwardly with respect to the coil;
   applying a sheath over the core before winding the cable onto the coil; and
   providing an indicium of the position of the slot in the core, wherein the indicium is a flattened longitudinally extended area of an outer surface of the sheath in correspondence with the slot longitudinal extension.

35. The method according to claim 34, wherein the sheath is applied by extrusion.

36. The method according to claim 34, further comprising the step of providing a water swellable material in the slot.

37. The method according to claim 34, comprising the step of providing an adhesive layer interposed between the core and the sheath and wherein said adhesive layer does not comprise a tape.

* * * * *